United States Patent
Kralis et al.

(10) Patent No.: US 11,001,025 B2
(45) Date of Patent: May 11, 2021

(54) SYSTEM AND METHOD FOR HIGH-YIELD ROSIN EXTRACTION

(71) Applicant: Konstantine P. Kralis, Skokie, IL (US)

(72) Inventors: Konstantine P. Kralis, Skokie, IL (US); Lance Nist, Santa Ana, CA (US)

(*) Notice: Subject to any disclaimer, the term of this patent is extended or adjusted under 35 U.S.C. 154(b) by 179 days.

(21) Appl. No.: 16/248,752

(22) Filed: Jan. 15, 2019

(65) Prior Publication Data
US 2020/0223168 A1   Jul. 16, 2020

(51) Int. Cl.
| | |
|---|---|
| *B30B 9/06* | (2006.01) |
| *B30B 15/04* | (2006.01) |
| *B30B 15/06* | (2006.01) |
| *B30B 15/16* | (2006.01) |
| *F16P 3/00* | (2006.01) |
| *F16P 3/14* | (2006.01) |
| *B30B 1/34* | (2006.01) |
| *C11B 1/08* | (2006.01) |
| *B30B 15/26* | (2006.01) |

(52) U.S. Cl.
CPC ............. *B30B 9/06* (2013.01); *B30B 15/047* (2013.01); *B30B 15/062* (2013.01); *B30B 15/165* (2013.01); *B30B 15/26* (2013.01)

(58) Field of Classification Search
CPC .......... B30B 9/06; B30B 9/04; B30B 15/047; B30B 15/062; B30B 15/165; B30B 15/16; B30B 15/00; B30B 1/34; B30B 9/10; C11B 1/08; F16P 3/141
See application file for complete search history.

(56) References Cited

U.S. PATENT DOCUMENTS

| | | | |
|---|---|---|---|
| 2,018,126 A | 8/1933 | Garrett | |
| 2,083,032 A | 6/1937 | MacMillin et al. | |
| 2,574,892 A * | 11/1951 | Schmidt | B30B 9/04 100/193 |
| 4,402,389 A * | 9/1983 | Adams | F16P 3/24 192/129 B |

(Continued)

FOREIGN PATENT DOCUMENTS

| | | |
|---|---|---|
| CN | 207105692 | 3/2018 |
| CN | 207984049 | 10/2018 |

(Continued)

OTHER PUBLICATIONS

English translate (DE202018102781U1), retrieved date Aug. 18, 2020.*

(Continued)

*Primary Examiner* — Adam J Eiseman
*Assistant Examiner* — Mohammed S. Alawadi
(74) *Attorney, Agent, or Firm* — Law Offices of Lisa & Lesko, LLC; Justin Lesko, Esq.

(57) ABSTRACT

Systems, devices, and methods are disclosed for a rosin press that allows improved extraction over existing presses. The press includes improved platens for rosin collection with built-in gutter rail collection systems and well-distributed force on the pressed product and multiple hydraulic rams. In addition, computerized systems are provided for controlling and monitoring the system in an automated fashion, as well as safety features to prevent injury and damage to the product, especially during automated pressing.

7 Claims, 16 Drawing Sheets

(56) References Cited

U.S. PATENT DOCUMENTS

| | | | | |
|---|---|---|---|---|
| 5,263,408 | A | * | 11/1993 | Blanchet .................. B30B 9/04 100/125 |
| 2016/0334160 | A1 | * | 11/2016 | Pallman ................. B30B 9/067 |
| 2018/0008655 | A1 | * | 1/2018 | Weikel ................. A61K 36/185 |
| 2018/0178473 | A1 | | 6/2018 | Perez et al. |

FOREIGN PATENT DOCUMENTS

| | | | | |
|---|---|---|---|---|
| DE | 202018102781 | U1 * | 8/2018 | ............... B30B 1/34 |
| EP | 2941961 | A1 * | 11/2015 | ............... B30B 9/04 |
| GB | 161861 | | 4/1921 | |
| GB | 161861 | A * | 4/1921 | ............. B30B 9/042 |
| RU | 2551979 | | 6/2015 | |

OTHER PUBLICATIONS

GDCMM, retrieved date Aug. 19, 2020.*
Bennet, Patrick, "What is Rosin?" (Dec. 23, 2015).
Pure Pressure's Pikes Peak, Longs Peak, V2 User Manual R2.1 (Undated).
Philosopher Seeds Blog "Making Bubble Hash with ice and water" (May 10, 2015).
"Electromagnetic Actuators," Electronics Hub (Sep. 19, 2015).
"Buy Electric Hydraulic Pumps—Free Shipping over $50," Zoro.com (downloaded Dec. 12, 2018).
"Norco Pumps—Electro/Hydraulic—Single Acting—10,000 P.S.I Capacity 910052A," Jack x Change (downloaded Dec. 12, 2018).
Doudar, Ramsey, "Pros and Cons of Different Concentrates," Herbn Elements (Jul. 10, 2017).
Andrew Ward, "What is Rosin & Why Does it Matter," PurePressure (Oct. 20, 2017).
"What is Rosin and Why You Need to Try It," Potguide.com (May 1, 2017).
June-Wells, Mark, and Lindback, Mitchell "Your Guide to Hydrocarbon Extraction," Cannabis Business Times (May 2, 2018).
My Press—My Rosin Press (Gen. 2) (downloaded Dec. 12, 2018).
Rosin Tech Products—Rosin Tech Smash (downloaded Dec. 12, 2018).
RosinPressNY—10-Ton Hydraulic Rosin Press (Copyright 2018).
HPN RosinTech Series 3"×4" Pneumatic 2 Ton Rosin Dual Heat Platen Heat Press Machine (downloaded Nov. 16, 2018).
Pure Pressure—Pikes Peak Press and Longs Peak Press, SpecSheet 1.1 (undated).
Rosin Tech—RTP Gold Manual Twist Herbal Heat Press (downloaded Nov. 19, 2018).
4×24×2 Hydraulic Log Splitter Cylinder by Prince Hydraulic Cylinder (downloaded Dec. 12, 2018).
SNS-US015 Product Sheet (downloaded Dec. 12, 2018).
SLICK™ CLEAR—Rosin Tech Products.
SLICK™ DUO—Rosin Tech Products.
SLICK™ PAD—Rosin Tech Products.
SLICK™ SHEET—Rosin Tech Products.
SLICK™ SLAB—Rosin Tech Products.
Screenshots of "Automated Rosin Press from PurePressure" video dated Oct. 9, 2018 and available at https://youtu.be/9mv-h3WZT4Q, last accessed Jan. 23, 2019.
Screenshots of "How to Make Hash Rosin Like a Pro" video dated Jan. 11, 2017 and available at https://www.youtube.com/watch?v=ZiNH1iXDVZg&has_verified=1, last accessed Jan. 23, 2019.
Machine Translations of CN207984049 to Anui Xinyuankang Biotechnology Co. and CN207105692 to Univ. of Wuhan Polytechnic (Feb. 2020).

* cited by examiner

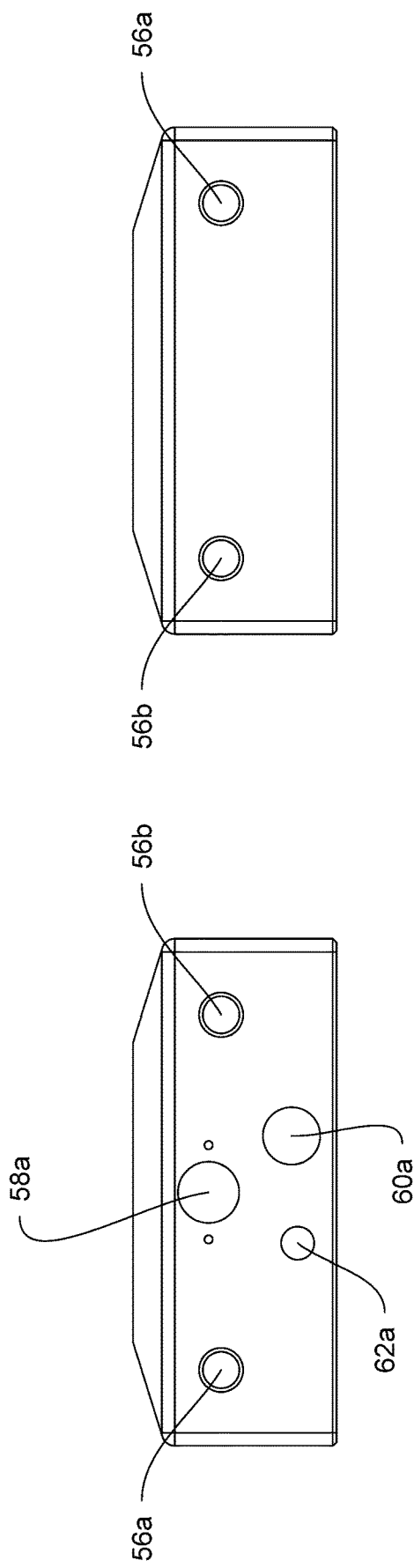
FIG. 5
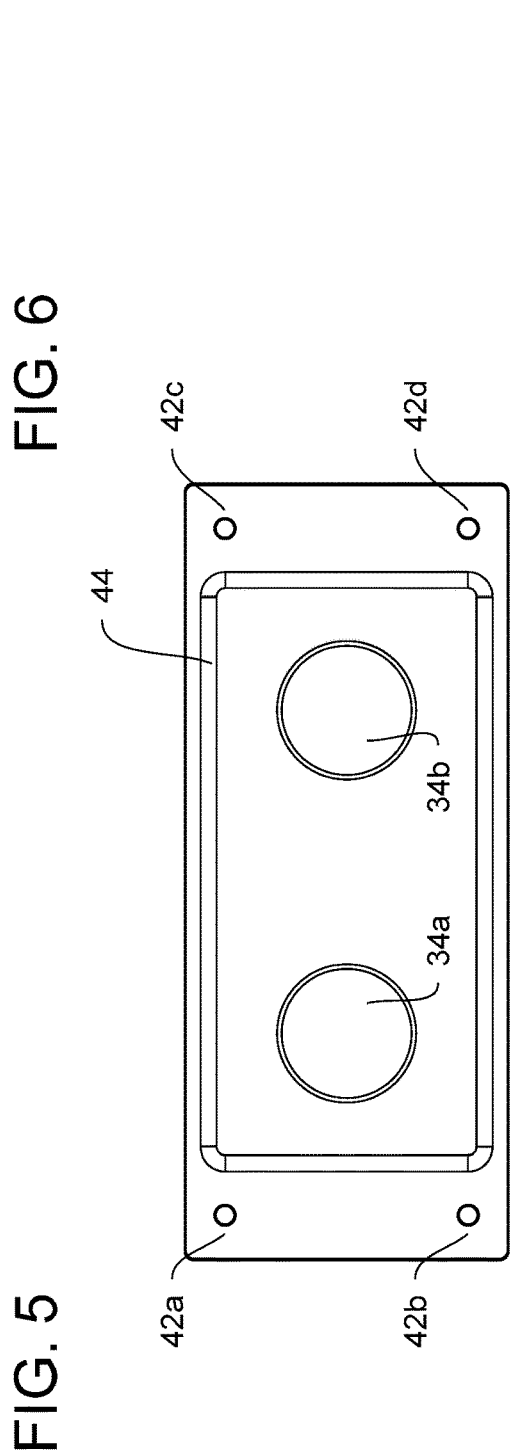
FIG. 6
FIG. 7

FIG. 29

Press Editor

Profile Name: Default Profile

Profile Notes: This profile is a generic profile for normal purposes

Step Number: 1 of 1
Step Time (Secs): 25.0
Step Pressure (PSIG): 3200
Upper Temperature (°C): 88
Lower Temperature (°C): 83

Keyboard 56.6

| 1 | 2 | 3 | Done |
| 4 | 5 | 6 | Cancel |
| 7 | 8 | 9 | Clear |
| - | 0 | . | |

Step -
Step +

Save
Exit

SYSTEM AND METHOD FOR HIGH-YIELD ROSIN EXTRACTION

BACKGROUND OF THE INVENTION

1. Field of the Invention

This application relates to and describes an improved rosin press for extracting oils from plants using heat and pressure without the need for solvents or additives. In addition, related devices and accessories are described such as collection trays, gages, alarm systems, control systems, and platens, among others. The materials cited below and provided with the attached IDS are incorporated by reference herein.

Rosin extraction refers to an extraction process that utilizes a combination of heat and pressure to nearly instantaneously squeeze resinous sap from plant material. See, e.g., Bennet, Patrick, "What is Rosin?" (Dec. 23, 2015), incorporated by reference and provided herewith, available at leafly.com. The plant material to be pressed into rosin can be dried or freeze dried cannabis flowers (which involves minimal pre-processing), kief (or dry sift), or it can be plant material that has already been processed, such as hash or "bubble hash." See, e.g., Pure Pressure's "Pikes Peak, Longs Peak, V2 User Manual R2.1" at page 19, and Philosopher Seeds Blog "Making Bubble Hash with ice and water" (May 10, 2015), both of which are incorporated by reference and provided herewith. Typically, the plant material is stored in a mesh filter bag with pore openings that are between 25 micron and 250 micron, depending on the application. The dimensions of the filter bag depend on the size of the press.

In existing systems, a layer of parchment paper is placed on the rosin press for collecting extracted rosin, and the filter bag containing plant material is placed on top of or inside of that parchment paper. Heat and pressure is applied by the press to the filter bag, which causes the rosin to be pushed through the pores of the filter bag and on to the parchment paper. The temperature and pressure varies depending on the application, and various temperature and pressure combinations can be applied to the bag during a single pressing (sometimes these combinations of temperature and pressure are referred to as "recipes"). Temperatures typically range between 100 Degrees and 300 Degrees Fahrenheit and pressures in the hydraulic line can be very low (10 PSI or less) or as high as 5,000 PSI in some applications.

Rosin presses are typically either hydraulically powered (using oil or water) or pneumatically powered (using compressed air or other gases). Electromagnetic actuators can also be used to power the press. See, e.g., "Electromagnetic Actuators," Electronics Hub (Sep. 19, 2015), incorporated by reference and provided herewith, available at electronicshub.org.

Suitable hydraulic pumps for driving the pistons of a hydraulic press include, for example, the EERPAC 0.5 Gal, 115 VAC Hydraulic Electric Pump, or the Norco Electric Hydraulic Pump, Model #910052A. See, e.g., "Buy Electric Hydraulic Pumps—Free Shipping over $50," Zoro.com and "Norco Pumps—Electro/Hydraulic—Single Acting—10,000 P.S.I Capacity 910052A," Jack x Change, incorporated by reference and provided herewith. A person having ordinary skill in the art will recognize that other hydraulic pumps are also suitable. The pistons can also be driven using an air compressor, a hand pump, a mechanical "twist" system, or other manual systems for applying pressure.

The plates in a rosin press are typically electrically heated. The controls and/or monitors for the rosin press can involve a computerized system with a digital display. The material that results from the pressing process is also called rosin, and it can be a translucent, sappy material (sometimes referred to as "shatter"), an oil-like substance, a budder or batter (more like a solid), or a wax-like material. The consistency of the rosin depends on the starting material and the details of the particular process used to extract the rosin, among other factors.

The process of rosin extraction, and use of the extracted rosin, has recently become popular in connection with marijuana/cannabis, but it is also used in connection with other plant-based materials. For example, rosin can be obtained from the oleoresin or deadwood of pine trees or from tall oil, and the oils extracted from that process can be used for making varnish. See merriam-webster.com. This devices and applications disclosed herein are described in the context of cannabis rosin and cannabis rosin extraction, although its applicability to rosin extraction from other plants will be apparent to those of ordinary skill in the art.

Rosin press extraction of cannabis oil offers significant benefits over cannabis oil extraction using solvents and chemicals. For a detailed description of the benefits of non-solvent rosin extraction (using a rosin press) versus extraction using solvents (such as hydrocarbon extraction processes), see the following articles, which are also incorporated by reference and provided herewith:

Doudar, Ramsey, "Pros and Cons of Different Concentrates," Herbn Elements (Jul. 10, 2017), available at herbnelements.com.

Andrew Ward, "What is Rosin & Why Does it Matter," PurePressure (Oct. 20, 2017) available at gopurepressure.com.

"What is Rosin and Why You Need to Try It," Potguide.com (May 1, 2017) available at potguide.com.

June-Wells, Mark, and Lindback, Mitchell "Your Guide to Hydrocarbon Extraction," Cannabis Business Times (May 2, 2018), available at cannabisbusinesstimes.com.

In short, extraction with solvents often involves dangerous flammable materials, significant manual labor, and a person with a high level of skill and knowledge of chemical reactions to oversee the processes. In addition, solvent-based extraction uses potentially poisonous or toxic solvents and can lead to chemical impurities in the extracted oil, especially if the chemical processes are not carried out correctly. These impurities and potentially toxic substances in the rosin are especially problematic in the cannabis industry, where the extracted cannabis oils are intended to be used in products for human consumption.

In contrast, rosin press extraction can be completed without using chemicals or solvents, and results in a pure and natural product. In rosin press extraction, no alcohol or chemicals are required, and it enables extraction of the full spectrum of flavor from the plant and all its essential oil, leaving behind stems leaves that are potentially toxic and linked to cancer.

Also, with rosin press extraction, the initial product to be pressed can be fresh, natural plant material (even straight from the ground) with full and natural moisture content, aroma, and flavor. With solvent-based extraction, the plant must be dried or treated with alcohol which adds time and expense and also detracts from the natural qualities and flavors of the plant.

However, a need exists in the art for better rosin presses and extraction methods.

2. Description of Related Art

Examples of existing rosin presses are provided herewith in the form of the spec sheets and other documents cited on the Information Disclosure Statement, including the following: My Press—My Rosin Press (Gen. 2); Rosin Tech Products—Rosin Tech Smash; RosinPressNY—10-Ton Hydraulic Rosin Press; HPN RosinTech Series 3"×4" Pneumatic 2 Ton Rosin Dual Heat Platen Heat Press Machine; Pure Pressure—Pikes Peak Press and Longs Peak Press, SpecSheet 1.1; Rosin Tech—RTP Gold Manual Twist Herbal Heat Press. These materials are incorporated by reference herein.

The existing presses suffer from multiple shortcomings, as explained below.

More specifically, a problem with existing presses is that each time the rosin press is used for extraction, the extracted rosin must be collected on a sheet of parchment paper or equivalent paper. An example of such a collection system is shown in Pure Pressure's "Pikes Peak, Longs Peak, V2 User Manual R2.1" at page 33. Parchment paper collection requires significant extra work by the operator in setting up the press, and the set up process is required every time the press is used. For example, Pure Pressure's system requires a user to place and secure (using clips) the parchment paper, place the rosin filter bag containing the material to be pressed on top of the paper, fold the parchment paper over the rosin filter bag, re-center the rosin filter bag, and then clip the folded over parchment paper into place. If the operator improperly places or fails to secure the paper, the paper may fail to collect the extracted rosin, leading to wasted material. In addition, an operator using this system is spending significant amounts of time with his hands inside the pressing area, which can lead to danger from the heat on the press or pressure if the pressing process is mistakenly started. Other systems use even more rudimentary methods of collecting the rosin extra on parchment paper. For example, in some systems, the paper is placed flat on the bottom press with the rosin filter bag placed on top, and the user must manually fold or otherwise manipulate the parchment paper during operation of the press. Manual manipulation of the parchment paper during pressing leads to even more wasted rosin and potential danger for the operator. The use of parchment paper is also an added cost for the parchment paper materials, and it creates environmental waste in the form of wasted paper.

As described in more detail below, one aspect of the system and method eliminates the need for parchment paper while providing a safe, effective system for collecting extracted rosin. More specifically, the lower platen of this aspect includes a gutter rail collector system that is designed to collect the extract as it oozes from the rosin filter bag. In one embodiment, the gutter rail system is designed with angled components that guide the extracted rosin to each of the four corners of the lower platen, with holes in the corners of the platen that "drain" into a tray, cups (for example, silicone cups), or other collection device underneath the platen, for easy collection. The lower platen can be made from brushed anodized aluminum, which functions well at the temperatures and pressures used for extraction while allowing the extracted rosin to easily be removed from the gutter system (without sticking, for example).

Another problem with existing rosin presses is that the platen applying pressure (either the upper or lower platen) is typically driven by a single rod or other driving mechanism attached to the platen with one contact point or a limited number of contact points that are not well distributed across the entire plate. As a result, the distribution of pressure on the platen is often non-uniform during the pressing process. A non-uniform pressure distribution results in a lower yield of rosin from the plant material (some areas of the rosin filter bag are not properly compressed between the platens) and lower quality rosin, and can even lead to a blow out of plant material from certain areas of the filter bag, if one side of the filter bag is being compressed more than the other. With a non-uniform pressure distribution and limited points of contact, the platens often, warp, twist, and fail.

Having few points of contact to drive the moving platen (for example, driving the platen through a single rod placed at the center of the platen) also limits the size of the platen. Specifically, with limited points of contact on the platen, the corners and edges of the platen are not stabilized. Due to compression of the platen itself in the area around the driving mechanism, the pressure at the driving mechanism (typically the center of the platen) is greater than the pressure at the edges. As the size of the platen increases and the corners and edges of the platen are located further away from the driving mechanism, this difference in pressure from the center to the outside, non-stabilized edges of the platen becomes problematic. Existing systems limit the size of the platen (and correspondingly the size of the rosin filter bags) to reduce this effect.

As explained below, in one aspect, multiple driving mechanisms and/or multiple, well-distributed points of contact on the platen are used to increase pressure uniformity throughout the entire platen, including at the platen outside edges. For example, two or more hydraulic rams can be used rather than a single ram. An exemplary ram for use with this aspect of the invention is the 4×24×2 Hydraulic Log Splitter Cylinder by Prince Hydraulic Cylinder. A sales sheet from Surplus Center describing this item is provided herewith and incorporated by reference, available at surpluscenter.com. A uniform pressure distribution allows for a better yield of extracted rosin because all areas of rosin filter bag are properly pressed throughout the extraction process. This also allows for larger platens, larger rosin filter bags, and correspondingly, more extracted rosin from a single run of the rosin press.

Another problem with existing rosin presses, and specifically presses with computerized control systems, is that the presses cannot interface wirelessly with remote devices, such as cellular phones, tablets, PDAs, or other computing devices. For example, existing presses are not enabled with Bluetooth, WIFI, or other wireless technologies for connecting to such remote devices. Even for simple tasks, such as software updates to the rosin press control system, the rosin press must be connected to a laptop or other computer via a USB cable, and the updates must be downloaded and installed via this separate computer. See, e.g., Pure Pressure's "Pikes Peak, Longs Peak, V2 User Manual R2.1" at page 31. This also makes it difficult for users to download/upload recipes from the rosin press system to locations on the internet, to share recipes among different users, and to remotely control and monitor the system.

In one form, the rosin press is equipped with Bluetooth, WIFI, and/or other wireless technologies to wirelessly connect to the internet and to cellular phones, tablets, and other remote devices. In this embodiment, software is provided and installed in an electronic memory (RAM, ROM, Flash, or other known electronic memory) on the computer system of the rosin press that can cause the computer system to communicate wirelessly to interact with software applications on phones, tablets, or other wireless devices. The wireless devices can be used to program, control, and/or monitor the press. The software that is installed on the rosin press computer system and wireless devices can be provided, for example, by the rosin press manufacturer or a third party on its behalf. Multiple devices and users can download the software for communicating with and controlling the rosin press, and different categories of permissions can be provided for different device users (for example, administrative permissions for some users but not others). Devices and users can also seamlessly share recipes and other information about the presses with each other and between the presses themselves (for example, a recipe saved on one press can be shared wirelessly over the internet or through an intermediary wireless device with another press).

Existing rosin presses also lack critical safety features. Partially or fully automated systems involve less user oversight, and therefore, built in safety features are important for these presses. Features described herein include for example ultrasonic sensors, heat sensors, pressure sensors, and fuses.

In one form of the systems and methods, ultrasonic sensors are used to prevent hands, body parts, or other items from being crushed during extraction. Specifically, ultrasonic sensors are mounted to the press to create a "force field" around the pressing area. For example, each sensor can be mounted on the top of the press and directed to the bottom of the press. With the sensors activated during pressing, they create "beams" that surround the pressing area, creating an ultrasonic barrier. Any time the barrier is interrupted by a hand or other object, the machine is programmed to immediately stop pressing and/or to immediately begin retracting. The SNS-US015 ultrasonic sensor has been successfully tested for this purpose, although other similar sensors also exist. See SNS-US015 Product Sheet, incorporated by reference and provided herewith, available at olimex.com.

In another form, a sensor/breaker fuse is built into one or more of the platens for "overtemp" protection. The system is programmed so that, when this overtemp sensor senses a certain maximum temperature (for example, 230 degrees Fahrenheit, but can be adjusted), the heat supply to the plates is cut off, for example, by the power supply to the platen heaters being interrupted. In the alternative, the entire process can even be stopped, and/or the press can be retracted. This safety feature is important for both preventing fires and overheating and also for protecting the valuable product from being burned or otherwise destroyed.

In another form, a pressure transducer is coupled to the rams of the press. Similar to the overtemp sensor, the pressure transducer is designed to monitor pressure throughout the manufacturing process and to shut down the system and/or cause the system to retract the rams if a certain maximum pressure threshold is exceeded.

Applicant(s) believe(s) that any material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), Applicant(s) will amend the specification to expressly recite the essential material that is incorporated by reference as allowed by the applicable rules.

SUMMARY

Aspects and applications of the systems, methods, and devices presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of post-AIA 35 U.S.C. § 112(f). Thus, the use of the words "function," "means" or "step" in the Detailed Description or Description of the Drawings or claims is not intended to somehow indicate a desire to invoke the special provisions of post-AIA 35 U.S.C. § 112(f), to define the invention. To the contrary, if the provisions of post-AIA 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of post-AIA 35 U.S.C. § 112(f). Moreover, even if the provisions of post-AIA 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The aspects, features, and advantages will be apparent to those artisans of ordinary skill in the art from the DETAILED DESCRIPTION and DRAWINGS, and from the CLAIMS. The use of the words "embodiment" and "object" in the specification is merely a convenience and not intended to indicate that certain features (or objects) of the invention are limited to only certain forms or examples (or embodiments) of the invention, and is not intended to correlate any claimed feature or object to any one form or embodiment of the invention either alone or in combination with other features, objects, forms, examples, or embodiments. However, without attempting to characterize or limit the scope of inventions as they are described and claimed, some of the advantages of the various features of the systems, methods, and devices are summarized below.

The rosin press and related accessories described herein are designed with improvements in at least four areas: rosin collection; pressing uniformity, stability, and efficiency;

wireless and internet connectivity; and safety. The rosin press and related accessories described herein are also better for commercially pressing high quantities of cannabis rosin.

It is an object of the invention to provide an improved platen for collecting rosin that is safe, effective, easy to set up, and efficient system for collecting rosin as it is extracted by the press, without the need for parchment paper or other such materials.

It is yet another (and optionally independent) object of the invention to provide a rosin press that applies a more uniform and stable pressure throughout the entire platen and filter bag, including in a system with large platens, by using multiple driving mechanisms and/or multiple, well-distributed points of contact on the platen.

It is yet another (and optionally independent) object of the invention to provide a rosin press equipped with Bluetooth, WIFI, and/or other wireless technologies to wirelessly connect to the internet and to cellular phones, tablets, and other remote devices. In some variations of this embodiment, multiple wireless devices and users can program, control, and/or monitor the press wirelessly, and recipes and other information about the presses can be shared among users and among multiple presses.

It is yet another (and optionally independent) object of the invention to increase safety in rosin presses and automated/semi-automated rosin presses using ultrasonic sensors, heat sensors, pressure sensors, and fuses.

In one exemplary form of the invention, a rosin press platen for pressing and collecting extracted rosin is provided that includes a generally flat and rectangular pressing area on the top surface of the platen and a rosin collection area surrounding the pressing area, wherein the rosin collection area comprises a series of grooves in the platen that are at a lower depth relative to the pressing area, such that extracted rosin flows into the grooves during pressing.

In one exemplary form of the invention, one or more openings are included in the rosin collection area through the bottom of the rosin press platen, wherein the grooves are sloped toward the one or more openings to guide extracted rosin to the one or more openings.

In one exemplary form of the invention, one or more receptacles for heating elements are provided in the platen.

In one exemplary form of the invention, a hydraulic rosin press is provided that includes a first hydraulic piston for driving a first hydraulic ram, a second hydraulic piston for driving a second hydraulic ram, a support rod fitted through the first hydraulic ram and the second hydraulic ram, and an upper platen, wherein the support rod, the first hydraulic ram, and the second hydraulic ram are each positioned to contact and transmit force to the upper platen during pressing operations.

In one exemplary form of the invention, the support rod is fitted through brackets on the upper platen that act to stabilize and align the support rod and the first and second hydraulic rams.

In one exemplary form of the invention, a lower platen is provided that includes a grooved rosin collection area for collecting extracted rosin.

In one exemplary form of the invention, a lower platen and a collection tray are provided, wherein the lower platen includes one or more openings through the bottom of the lower platen for guiding extracted rosin into the collection tray.

In one exemplary form of the invention, a horizontal top support for the press is located above the hydraulic pistons and first and second vertical side supports are connected to the horizontal top support. The first and second vertical side supports are approximately parallel to each other and extend downward from the horizontal top support and the first and second vertical side supports are approximately the same length. In addition, a first horizontal side base support is located beneath the first vertical side support to form a "T" structure with the first vertical side support. In addition, the press includes first and second cross supports that connect from each end of the first horizontal side base support to the first vertical side support to form a first triangular support structure. The press also includes a second horizontal side base support located beneath the second vertical side support to form a "T" structure with the second vertical side support, as well as third and fourth cross supports that connect from each end of the second horizontal side base support to the second vertical side support to form a second triangular support structure. In addition, a horizontal base center support is located beneath the horizontal top support and beneath the hydraulic pistons and a pressing area of the rosin press, such that the horizontal base center support and horizontal top support are approximately parallel to each other located between the pressing area of the rosin press. The horizontal base center support is connected to the first horizontal side base support, second horizontal side base support, first vertical side support, and second vertical side support.

In one exemplary form of the invention, the horizontal top support, horizontal base center support, first horizontal side base support, second horizontal side base support, first vertical side support, and second vertical side support are I-beams.

In one exemplary form of the invention, the press includes a lower platen that is attached to the rosin press and removeable, located beneath the upper platen.

In one exemplary form of the invention, the system includes a temperature sensor attached to the upper platen. The temperature sensor is configured to send a signal to interrupt heat supply to the upper platen if the temperature measured by the sensor exceeds a designated maximum temperature.

In one exemplary form of the invention, the system includes ultrasonic sensors arranged to form an ultrasonic field around a pressing area of the rosin press when activated. The rosin press is configured to automatically shut off when the ultrasonic field is interrupted during pressing operations.

In one exemplary form of the invention, the rosin press is computer-controlled rosin press, and includes a pressing area. The computer control system includes a memory configured to store profile information for multiple pressing profiles, wherein each pressing profile includes a series of steps comprising time, temperature, and pressure settings for the rosin press. The computer controller is configured to control the rosin press, receive pressing instructions from a wireless device via a wireless interface, send information to the wireless device, including temperature and pressure information, send pressing profiles to and receive pressing profiles from the wireless device, and execute pressing profile steps according to a selected pressing profile.

In one exemplary form of the invention, the system includes one or more servers for storing pressing profiles operable to wirelessly send pressing profiles to the computer-controlled rosin press and the wireless device and wirelessly receive pressing profiles from the computer-controlled rosin press and the wireless device.

In one exemplary form of the invention, the system includes a user profile with one or more associated pressing profiles stored on the one or more servers, wherein the computer controller is configured to send pressing profile information stored on the memory to the one or more servers to be associated with the user profile.

In one exemplary form of the invention, the lower platen includes a grooved rosin collection area for collecting extracted rosin.

In one exemplary form of the invention, the computer-controlled rosin press includes a temperature sensor attached to a platen of the rosin press, wherein the temperature sensor is configured to send a signal to the computer controller that interrupts heat supply to the upper platen if the temperature measured by the sensor exceeds a designated maximum temperature.

In one exemplary form of the invention, the computer-controlled rosin press includes ultrasonic sensors arranged to form an ultrasonic field around a pressing area of the rosin press when activated, wherein the ultrasonic sensors send a signal to the computer controller to shut off the press when the ultrasonic field is interrupted during pressing operations.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 5 depicts a right side view of the first embodiment of the upper platen.

FIG. 6 depicts a left side view of the first embodiment of the upper platen.

FIG. 7 depicts a top view of the first embodiment of the upper platen.

FIGS. 27-31 show exemplary graphical user interface (GUI) screens for certain embodiments of the rosin press.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
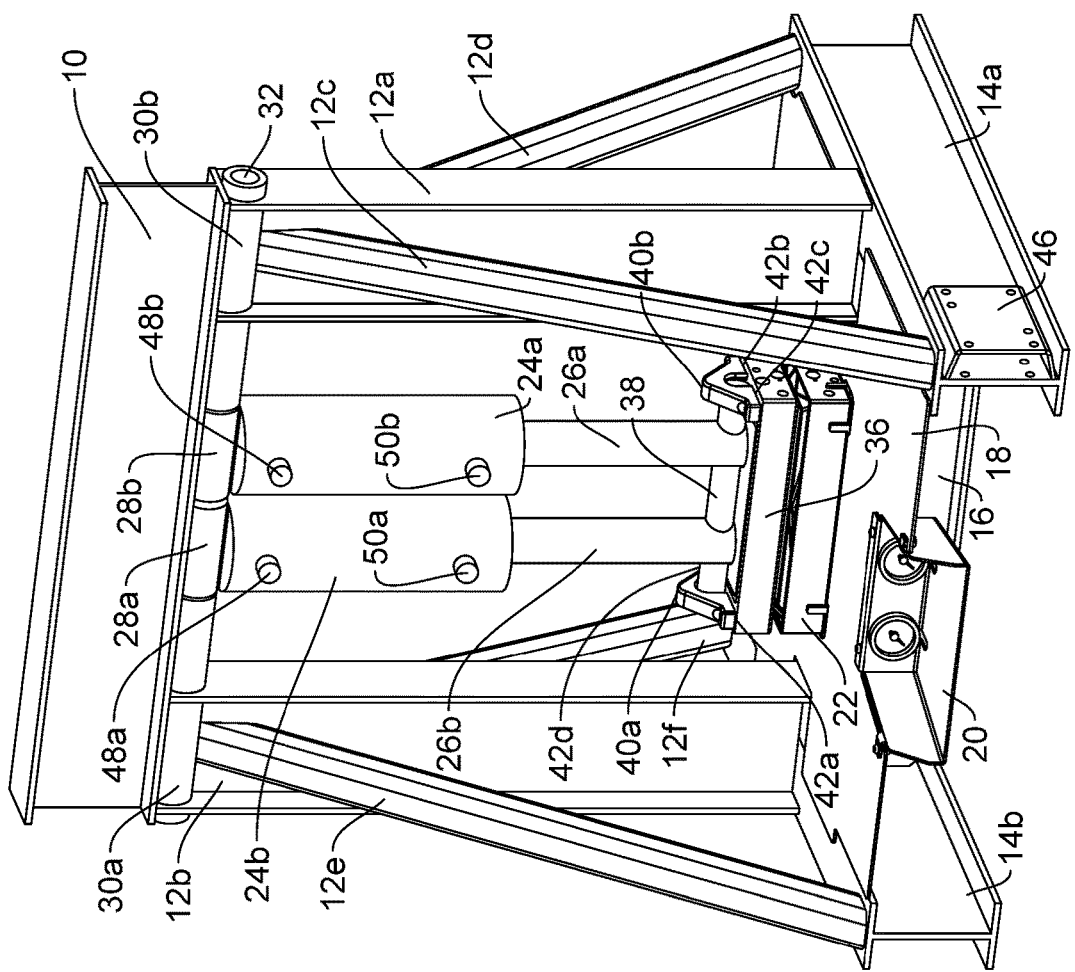
FIG. 1 depicts an isometric view of an embodiment of the hydraulic rosin press, which includes (among other items) I-beam supports with angled support beams, an upper hydraulic support rod inserted through female cylinders to secure two hydraulic pistons, which drive two rams that fit into an upper platen, an upper platen support rod that fits through the rams and support brackets that are also attached to the upper platen, a lower platen, heat gages, and a manual control housing.
Figure 3:
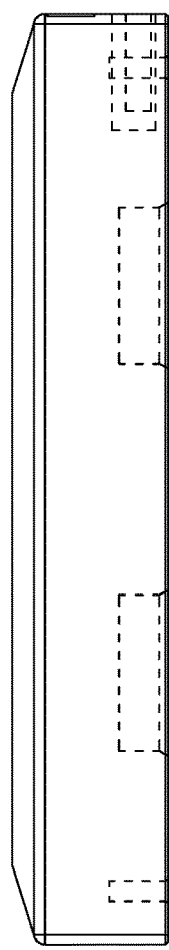
FIG. 3 depicts a front view of the first embodiment of the upper platen.
Figure 4:
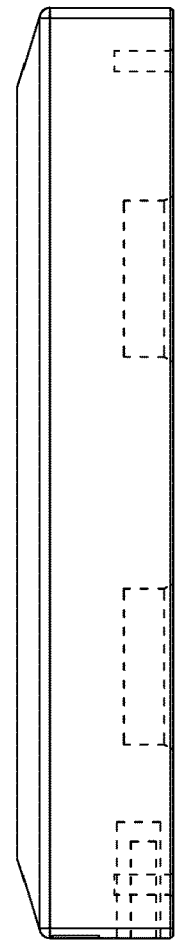
FIG. 4 depicts a back view of the first embodiment of the upper platen

FIG. 1 depicts one form of the hydraulic rosin press. This example of the press includes a horizontal top I-beam support (10), vertical side I-beam supports (12a and 12b), horizontal side base I-beam supports (14a and 14b), and a horizontal base center I-beam support (16). In this embodiment, cross supports (12c, 12d, 12e, and 12f) are attached to the vertical side I-beam supports (12a and 12b) and horizontal side base I-beam supports (14a and 14b) to further stabilize the rosin press.

Generally, the I-beam supports and cross supports in this embodiment are made from cast iron and welded to each other at the various points of contact show in the figures (although other known methods of attachment may also be suitable). For example, the upper ends of side I-beam supports (12a and 12b) are welded to top I-beam support (10). The upper ends of cross supports (12c, 12d, 12e, and 12f) are welded to side I-beam supports (12a and 12b). The lower ends of cross supports (12c, 12d, 12e, and 12f) and lower ends of side I-beam supports (12a and 12b) are welded to side base I-beam supports (14a and 14b). The ends of base center I-beam support (16) are welded to the center, interior sides of each of the side base I-beam supports (14a and 14b). As shown, the top I-beam support (10) is approximately parallel to the base center I-beam support (16) to maximize stability and support during pressing.

Although the top, side and base supports can be made from other materials, the I-beams are advantageous for several reasons, including 1) they provide a stable base that is very secure under pressure and 2) the I-beams are readily available in a variety of shapes and sizes, and different I-beam sizes can be used depending on the desired size and maximum pressure needed for a particular rosin press. The particular geometric design shown in the drawings also helps to maintain stability during earthquakes and similar events.

Figure 23:
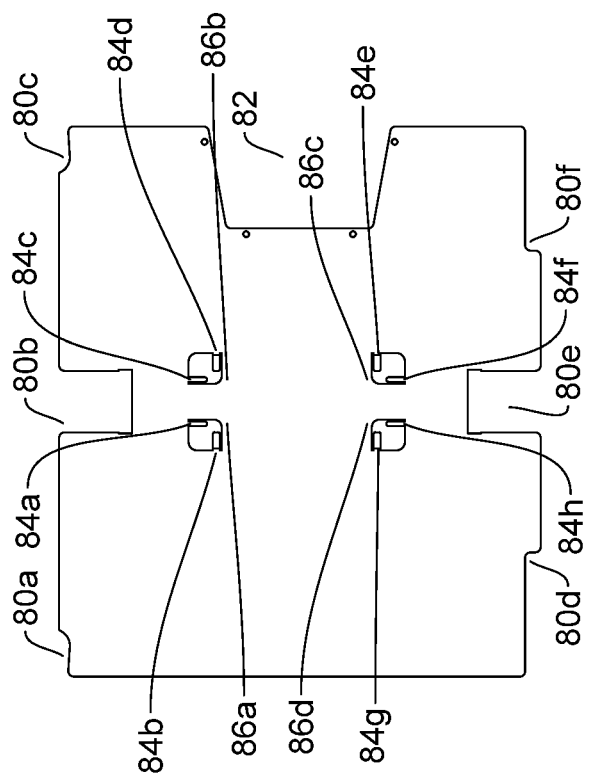
FIG. 23 depicts a top view of the rosin press floor piece.

The rosin press floor (18) rests upon the side base I-beam supports (14a and 14b), and base center I-beam support (16). It can also be welded to the I-beams. FIG. 23 provides a detailed top view of the rosin press floor piece. The floor in this embodiment includes several notches (80a, 80b, 80c, 80d, 80e, and 80f in FIG. 23) to fit around the support beams and a notch (82 in FIG. 23) for the heat gauge tray (20). In addition, the rosin press floor (18) includes tabs (84a-84h in FIG. 23) for aligning and securing the lower platen (22). As shown in FIG. 1, the lower platen (22) sits above the base center I-beam support (16) so that it is supported by the base center I-beam support during pressing operations.

With the tabs (84 in FIG. 23), the position of the lower platen (22) that collects the extracted rosin can be adjusted or realigned, so that the lower platen properly lines up with the upper platen. The tabs contact the side of the lower platen, near the corners, and in one embodiment, the tabs are tapped with a hammer until the top and bottom platen are aligned.

With this method, the lower platen (22) is removable and can be adjusted (although, in the alternative, the bottom platen can also be permanently affixed to the floor once aligned, for example, by welding). In certain embodiments the lower platen (22) can act as a tray that is easily removed from the floor so that the collected rosin can be poured or otherwise removed from the lower platen.

Optionally, the rosin press floor (18) also includes drain holes (86a-86d in FIG. 23). As explained in further detail below, the lower platen (22) in certain embodiments is designed such that extracted rosin flows to its corners and out through holes. In the forms of the system with drain holes (86a-86d) in the rosin press floor, the extracted rosin also flows through the drain holes (86a-86d) and into a basin, cups, or other suitable collection devices located under the rosin press floor.

The example shown in FIG. 1 includes two hydraulic pistons (24a and 24b) used to drive two hydraulic rams (26a and 26b). Alternatively, a single piston and ram or more than two hydraulic rams and pistons can be used. Two pistons are selected in this embodiment because as arranged and described herein, they help maintain a more uniform pressure across the platen during pressing. The hydraulic pistons (24a and 24b) are welded or otherwise affixed to female cylinders (28a and 28b). Female cylinders (30a and 30b) of like diameter are also welded or otherwise affixed to the top I-beam support (10) and side I-beam supports (12a and 12b).

With this arrangement of the female cylinders of like size on the pistons and supports, an upper hydraulic support rod (32) can be inserted through female cylinders 28a, 30a, 30b, and 28b in order to stably secure the hydraulic pistons under the top I-beam support (10). The hydraulic support rod is designed to withstand pressures of 20,000 PSI in a system where 10,000 maximum PSI to the hydraulic line is expected (for a factor of safety). In one embodiment, a two inch stainless steel bar hydraulic actuator is used, but other bars/materials that can withstand these loads can also be used.

The hydraulic rams (26a and 26b) fit into bores (34a and 34b) in the upper platen (36), and also include holes with a diameter sufficient to fit the upper platen support rod (38). In one example, the upper platen support brackets (40a and 40b) include retaining tabs to secure the upper platen support rod into place and prevent left and right movement, but also keep it removable (the tabs can be tightened or loosened). The brackets (40a and 40b) are fastened with bolts or screws, welded, or otherwise secured to the upper platen (34) at points 42a, 42b, 42c, and 42d.

The brackets (40a and 40b) keep the upper platen support rod aligned and also help to ensure that the hydraulic rams (26a and 26b) stay in alignment. During pressing operations, the upper platen support rod (38) is in contact with and distributes force on the upper platen 36. Accordingly, the device/system includes multiple "points of contact" to distribute force generated by the hydraulic press during pressing on the upper platen 36: the two center bores 34a and 34b and the support rod 38 are all pressing down on the upper platen 36 to cause a more equal distribution of force on the upper platen and correspondingly, the filter bag. The force is distributed across the plate including near the outside edges of the plate, rather than being concentrated in one area (such as the plate center).

Figure 2:
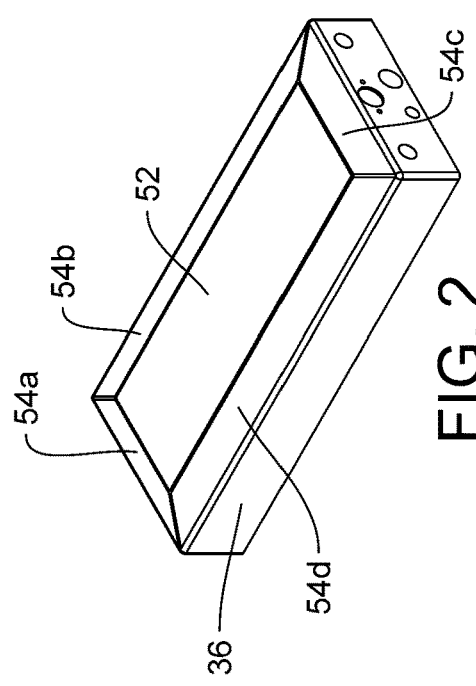
FIG. 2 depicts an isometric view of a first embodiment of the upper platen.

FIGS. 2-8 depict more detailed views of the upper platen as described above, including the center bores 34a and 34b and connection points for the bracket (42a, 42b, 42c, and 42d). Optionally, as shown in FIGS. 2-8, the upper platen top side also includes a moat (44) for collecting any dripping hydraulic fluid from the hydraulic cylinder, hydraulic rod, or tubing described above. As shown in FIG. 2, the bottom of the upper platen includes a rectangular, flat surface (52) and beveled edges (54a-54d). The rectangular, flat surface (52) is the part of the upper platen that is in contact with the filter bag containing plant material during pressing operations, as explained in further detail below.

In one form, both the upper and lower platens are made from aluminum, because of the cost and heat conductivity properties of aluminum, but they can also be made from steel or other suitable strong, conducting metal that will not bend under the pressure and heat described herein. The platens can also be hard anodized to prevent corrosion of the platens, and also to prevent extracted rosin from sticking to the platens, so that it can be removed from the platen and also flow through the gutter rails on the lower platen more easily.

As shown in FIG. 5, the upper platen also includes a number of holes to house various components of the system. Two of these holes (56a and 56b) are bored all the way through the platen to house cartridge heaters for heating the platen. The cartridge heaters are shaped like rods with wires that extend to connect them to a source of electricity. The cartridge heaters are pulse-width modulated to control platen temperature. Of course, the cartridge heaters are not the only way to heat the platens, as those skilled in the art will recognize. For example, in alternate form, the platens are manufactured from ferrous material and heated through induction heaters, such as the heaters used with standard induction cooktops. With larger platens, induction heating may in some circumstances be more efficient than heating with the cartridge heaters.

Another of these holes (58a) is used to house the overtemp sensor, described in more detail below. Hole 60a houses a computer sensor for communicating information to the computer system automated versions of the system. Hole 62a is for a manual temperature sensor that is attached to a temperature gauge in some embodiments, wherein the gauge tray (20) houses the temperature gauge. Holes 58a, 60a, and 62a do not need to be drilled all the way through the platen (for example, they can be about 1 inch deep within the side of the platen).

Figure 12:
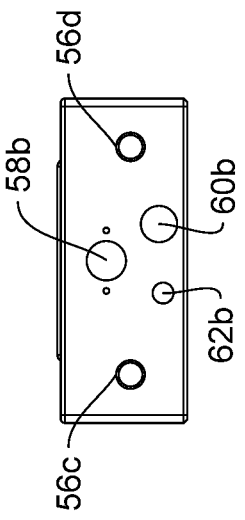
FIG. 12 depicts a right side view of the first embodiment of the lower platen with a gutter rail collection system.
Figure 13:
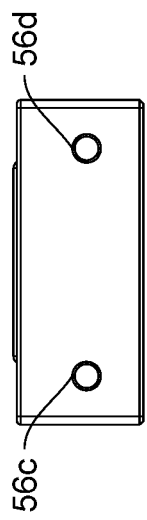
FIG. 13 depicts a left side view of the first embodiment of the lower platen with a gutter rail collection system.
Figure 11:
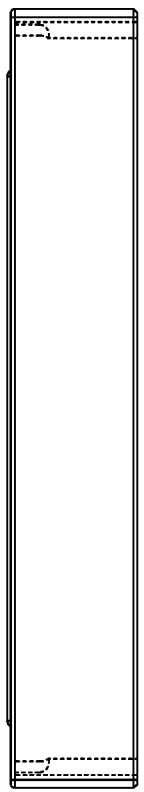
FIG. 11 depicts a back view of the first embodiment of the lower platen with a gutter rail collection system.
Figure 15:
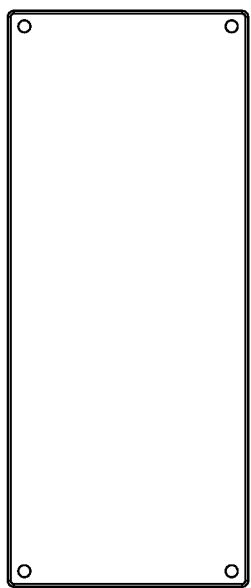
FIG. 15 depicts a bottom view of the first embodiment of the lower platen with a gutter rail collection system.
Figure 16:
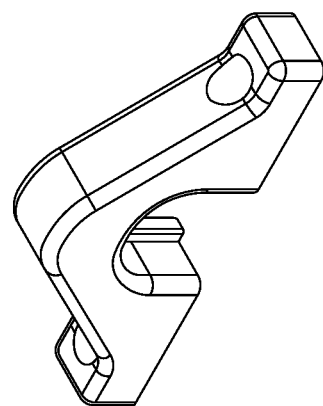
FIG. 16 depicts an isometric view of a first embodiment of an upper platen support bracket.
Figure 14:
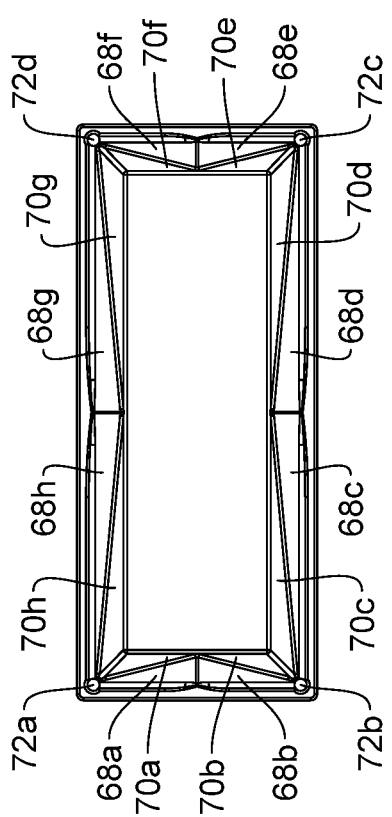
FIG. 14 depicts a top view of the first embodiment of the lower platen with a gutter rail collection system.
Figure 18:
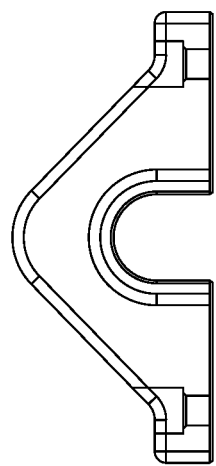
FIG. 18 depicts a back view of the first embodiment of the upper platen support bracket.
Figure 19:
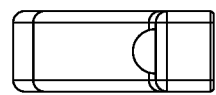
FIG. 19 depicts a right side view of the first embodiment of the upper platen support bracket.
Figure 17:
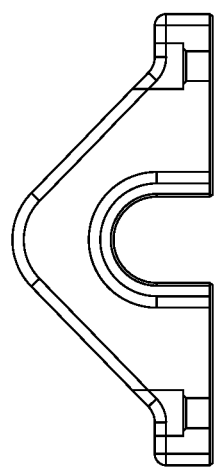
FIG. 17 depicts a front view of the first embodiment of the upper platen support bracket.
Figure 21:
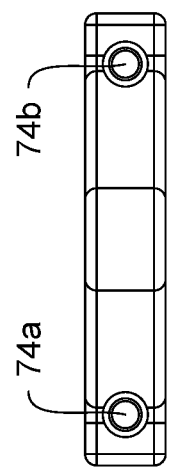
FIG. 21 depicts a top view of the first embodiment of the upper platen support bracket.
Figure 22:
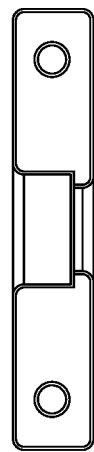
FIG. 22 depicts a bottom view of the first embodiment of the upper platen support bracket.
Figure 20:
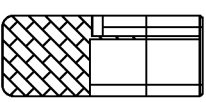
FIG. 20 depicts a left side view of the first embodiment of the upper platen support bracket.

Corresponding holes 56c and 56d for cartridge heaters, 58b for the overtemp sensor, 60b for the computer sensor, and 62b for the manual temperature sensor also can be implemented in the lower platen, as shown in FIG. 12.

FIG. 1 also shows a manual control housing (46) for housing controls for the rosin press, including controls for the temperature, for setting pressure of the hydraulic pump, and for other tasks that can be set "manually." The manual control housing (46) can be placed in the location as shown or in other suitable locations on the rosin press that are not near the pressing area. The manual control housing can also be removable or separate from the rosin press.

The manual control housing (and controls) are not required. In some forms of the press, only the manual controls are used to adjust temperature, pressure, etc. In other forms, the manual controls do not exist, and all of the function is computer controlled. The system can also include a touchscreen and/or wireless capabilities to be controlled by a remote device, as explained in further detail below. In yet another form, both manual and computer controls are available to be used, or some combination of the two is used to control the press.

FIG. 1 also shows the top chamber inlets (48a and 48b) and bottom chamber outlets (50a and 50b) of the hydraulic pistons (24a and 24b). The chamber inlets and outlets are used to pump hydraulic fluid (such as oil) into or out of the hydraulic pistons to create pressure that is transferred to the upper platen and the filter bag containing plant material that is placed between the upper platen and lower platen (as explained in further detail below). Specifically, during a pressing operation, hydraulic fluid (such as oil) is pumped through lines (such as 3/8" aluminum lines) into the top chamber inlets (48a and 48b) of the hydraulic pistons (24a and 24b). Both lines can be attached to the same pump, with a single line from the pump being split by a "T" to send hydraulic fluid into both top chamber inlets (48a and 48b). In the alternative, multiple pumps can be used (with separate lines feed fluid to each top chamber inlet).

The press is compatible with 12V or 120V hydraulic pumps. The pumps and other components that require electricity can be plugged into a standard 120 V wall outlet for the power source, or battery power using an inverter can be used as a substitute. One set of batteries and plugs can be used to power everything, or each electric component of the system can have its own separate power source, in some embodiments.

In another adaptation, solar power can also be used to power the rosin press. This is particularly advantageous in processing cannabis or other plant materials right on the site where it is grown, in an outdoor environment. Processing fresh product on site can lead to better results in both flavor and quality of the extracted rosin.

Figure 9:
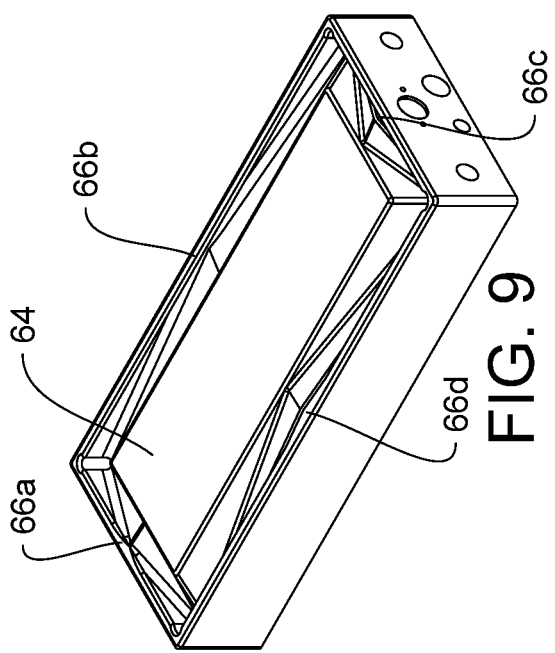
FIG. 9 depicts an isometric view of a first embodiment of the lower platen with a gutter rail collection system.
Figure 8:
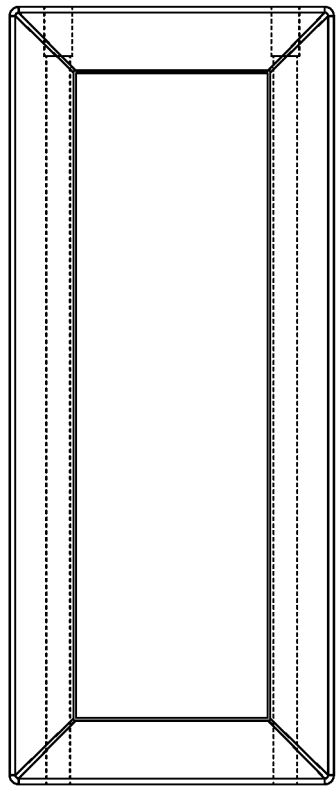
FIG. 8 depicts a bottom view of the first embodiment of the upper platen.
Figure 10:
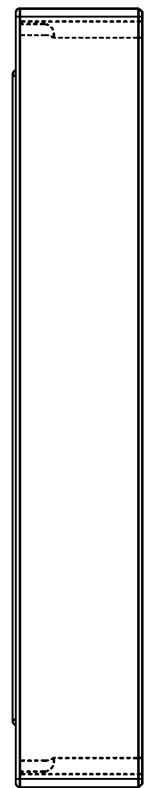
FIG. 10 depicts a front view of the first embodiment of the lower platen with a gutter rail collection system.

FIGS. 9-15 depict a first example of the lower platen (22) with gutter rail collection system. As shown in FIG. 9, the lower platen also includes a rectangular flat surface (64). This rectangular flat surface is typically the same size the rectangular, flat surface (52) of the upper platen (36), and during pressing operations, the two rectangular flat surfaces are generally aligned and press against each side of the filter bag with plant material (placed between the two rectangular flat surfaces).

The lower platen also includes a gutter rail collection system 66. As shown, the gutter rail collection system has four "peaks" (66a, 66b, 66c, and 66d), with one peak at each side of the rectangle. From each side of each of the peaks, a sloping rail (labeled 68a-68h) extends toward each of the corners of the upper platen, so that gravity will cause rosin oozing from the filter bag to slide down the rails and into the corners. Additional sloping rails (labeled 70a-70h) also slope downward from the corners of the rectangular flat surface (64) toward the corners.

In this form, the lower platen (22) has holes (72a-72d) bored at each of its four corners. In this embodiment, the holes are bored all the way through the bottom of the lower platen such that the rosin is "drained" out the bottom of the lower platen, through the holes (86a-86d in FIG. 23) in the rosin press floor (18), and into cups, a collection tray (or trays), or another suitable collector underneath the rosin press floor.

The form or example disclosed in FIGS. 9-15 is not the only possible arrangement for the gutter rail system and lower platen. For example, the gutter rails system can exclude the sloping rails, so that the rail system includes only the peaks with slopes from those peaks to each of the four corners. The gutter rail system can also consist of a rectangular "moat" that does not include any sloping rails or peaks. The holes 72a-72d can also be excluded in certain embodiments, such that the lower platen itself acts as the tray for collecting the rosin. In other embodiments, the holes 72a-72d are not bored all the way through the lower platen but act as reservoirs to collect the rosin within the bottom platen.

In yet another form, the gutter rail system includes holes at approximately the center of each side rather than the corners, and the gutter rails slope down from each of the corners to the center holes to guide extracted rosin through the bottom of the lower platen. In yet another exemplary embodiment, all of the gutter rails are designed to slope toward a single hole through the bottom of the lower platen—for example, with sloping rails that begin at the top left corner and extend downward toward the top right corner and downward toward the bottom left corner, and then further downward from the top right corner and also further downward from the bottom left corner, so that all of the rosin is guided down (with gravity) the series of rails toward a hole in the bottom right corner and out of the bottom of the plate.

Of course the lower platen can also have no gutter rail system, and parchment paper can be used to collect extracted rosin.

As explained above, the lower platen can be removable, and thus, multiple lower platen configurations can be available (and sold separately) for a single press that are interchangeable. The user can choose the lower platen depending on preference and/or the particular application.

The lower platen can be made from brushed anodized aluminum, which functions well at the temperatures and pressures used for extraction while allowing the extracted rosin to easily be removed from the gutter system (without sticking, for example).

FIGS. 16-22 depict a an example of one of the upper platen support brackets (shown as 40a and 40b in FIG. 1). As shown, bolt holes 74a and 74b are included on each side of the upper platen support bracket for fastening the upper platen support brackets to the upper platen. During pressing operations, the upper platen support rod causes pressure to be applied to the upper platen. The upper platen support brackets keep the upper platen support rod in alignment and during pressing operations and prevent slipping. Optionally, tabs can be included on the support brackets to further secure the upper platen support rod.

One of the key benefits to the various embodiments described above is that most of the parts are removable, and therefore the press is serviceable. For example, hydraulic rams can be removed, replaced or repaired, and so can parts like the platens. As useful additional time "for sale" and additional source of revenue, variations of the lower platen can be offered, and interchangeably swapped in and out of the machine (for example different colors, styles and shapes for the lower platen). The same applies to other parts within the rosin press.

Figure 24:
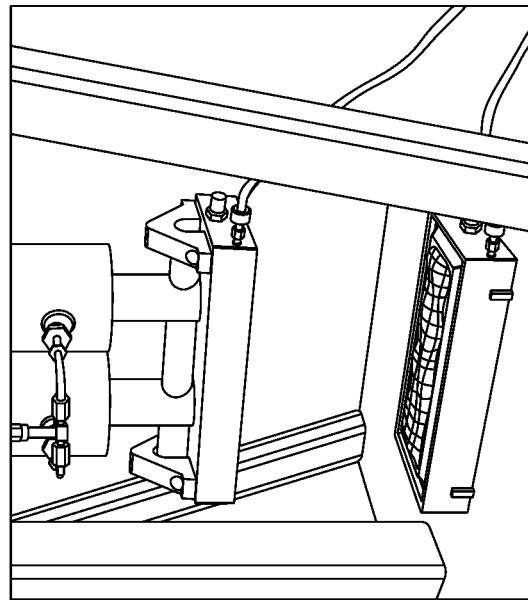
FIG. 24 shows the mesh filter bag on the press, just prior to operation of the press for extraction.

FIG. 24 shows the mesh filter bag on the press, just prior to operation of the press for extraction.

Figure 25:
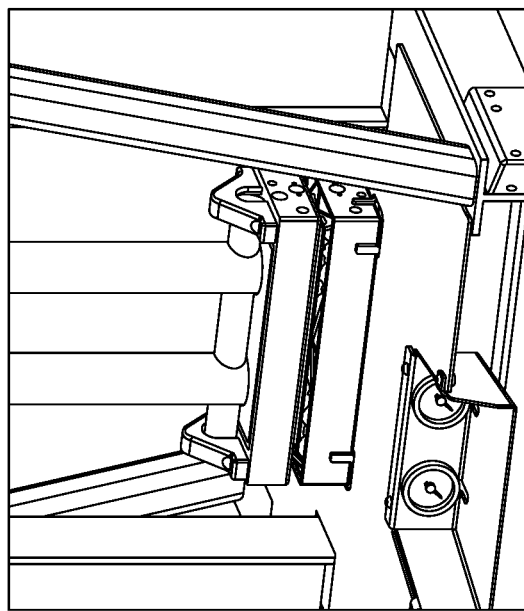
FIG. 25 shows a close up view of the platen area of the press during extraction, with rosin oozing from the filter bag and collecting in the lower platen.

FIG. 25 shows a close up view of the platen area of the press during extraction, with rosin oozing from the filter bag and collecting in the lower platen.

Figure 26:
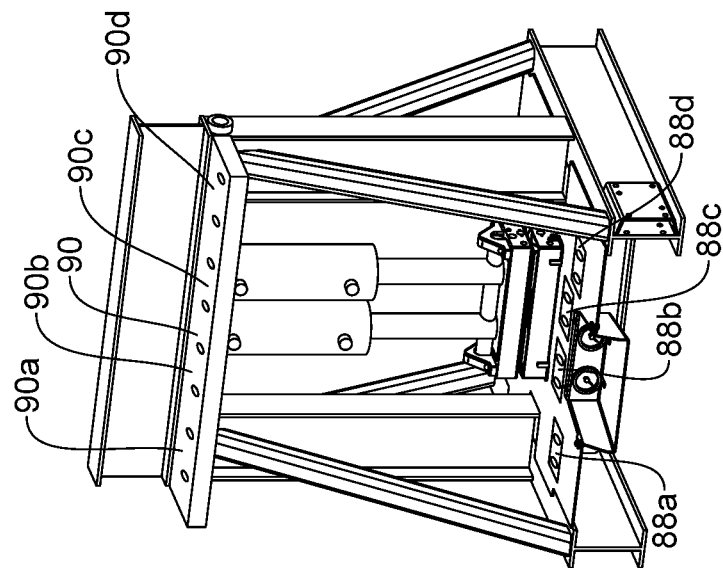
FIG. 26 shows an example of an ultrasonic barrier around the pressing area.

FIG. 26 shows an example of an ultrasonic barrier around the pressing area. As shown in this example, ultrasonic sensors (88a through 88d) are attached to the rosin press floor (18) to create an ultrasonic barrier that is generally perpendicular to the floor. In this embodiment, a shelf (90) is welded or otherwise attached to the top I-beam support (10) and/or vertical side I-beam supports (12a and 12b). Additional ultrasonic sensors (90a through 90d) are attached to the bottom of the shelf (90) facing downward and perpendicular to the shelf, toward the other ultrasonic sensors. In this manner an ultrasonic barrier is created on the front side of the rosin press. A similar barrier can be created on the backside of the rosin press in essentially the same manner (ultrasonic sensors on the rosin press floor and on a shelf).

The ultrasonic sensors are activated during pressing operations, to activate the barriers. In this manner, if the barrier is interrupted by a hand or other object during operations, the machine is programmed to immediately stop pressing and/or to immediately begin retracting. The barrier shown in FIG. 26 is exemplary, and a person of ordinary skill in the art will recognize that the barrier can be formed in other ways (for example, by placing the sensors on posts and facing them horizontally relative to the floor to create a horizontal barrier).

Figure 27:
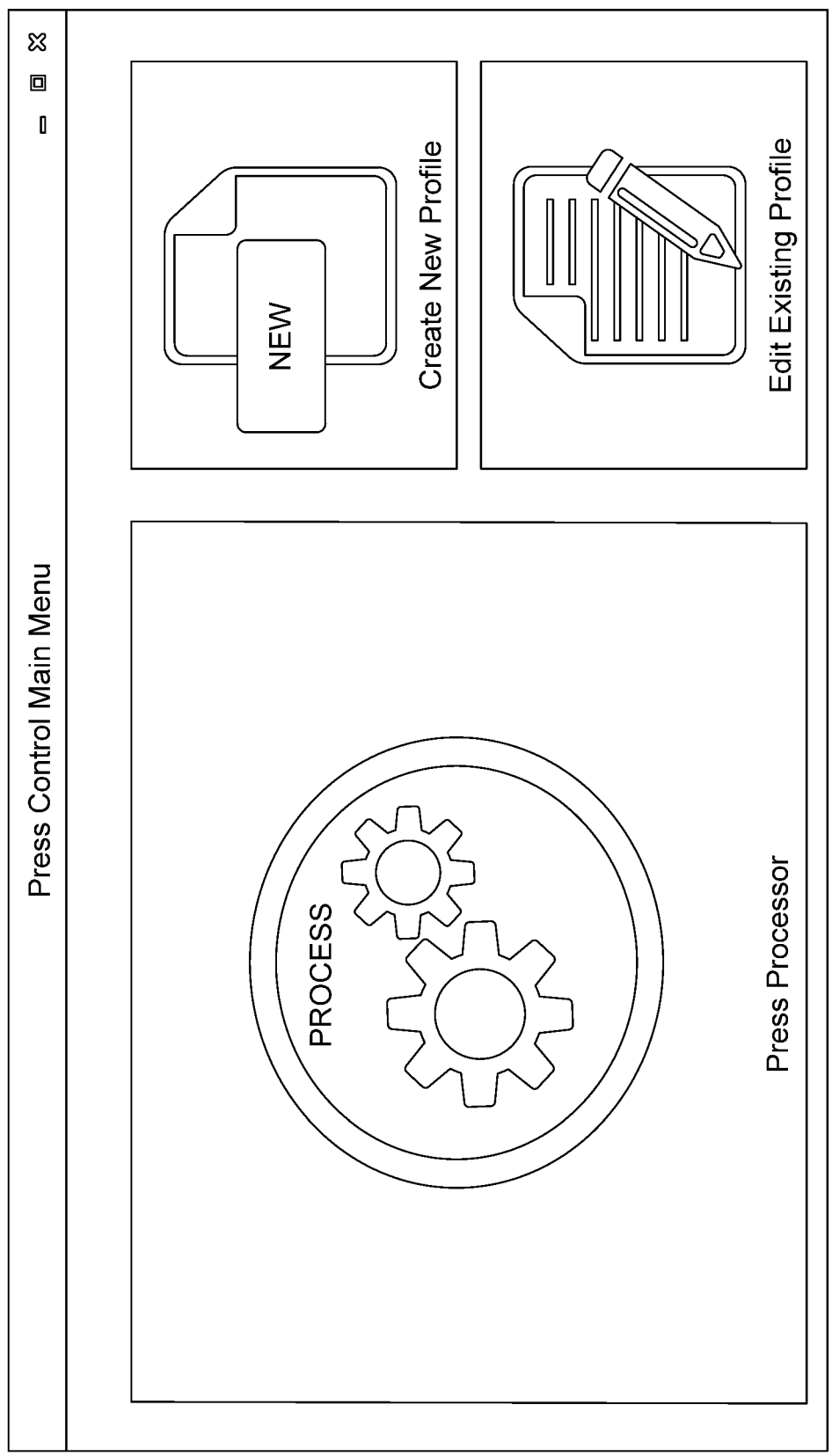
Figure 28:
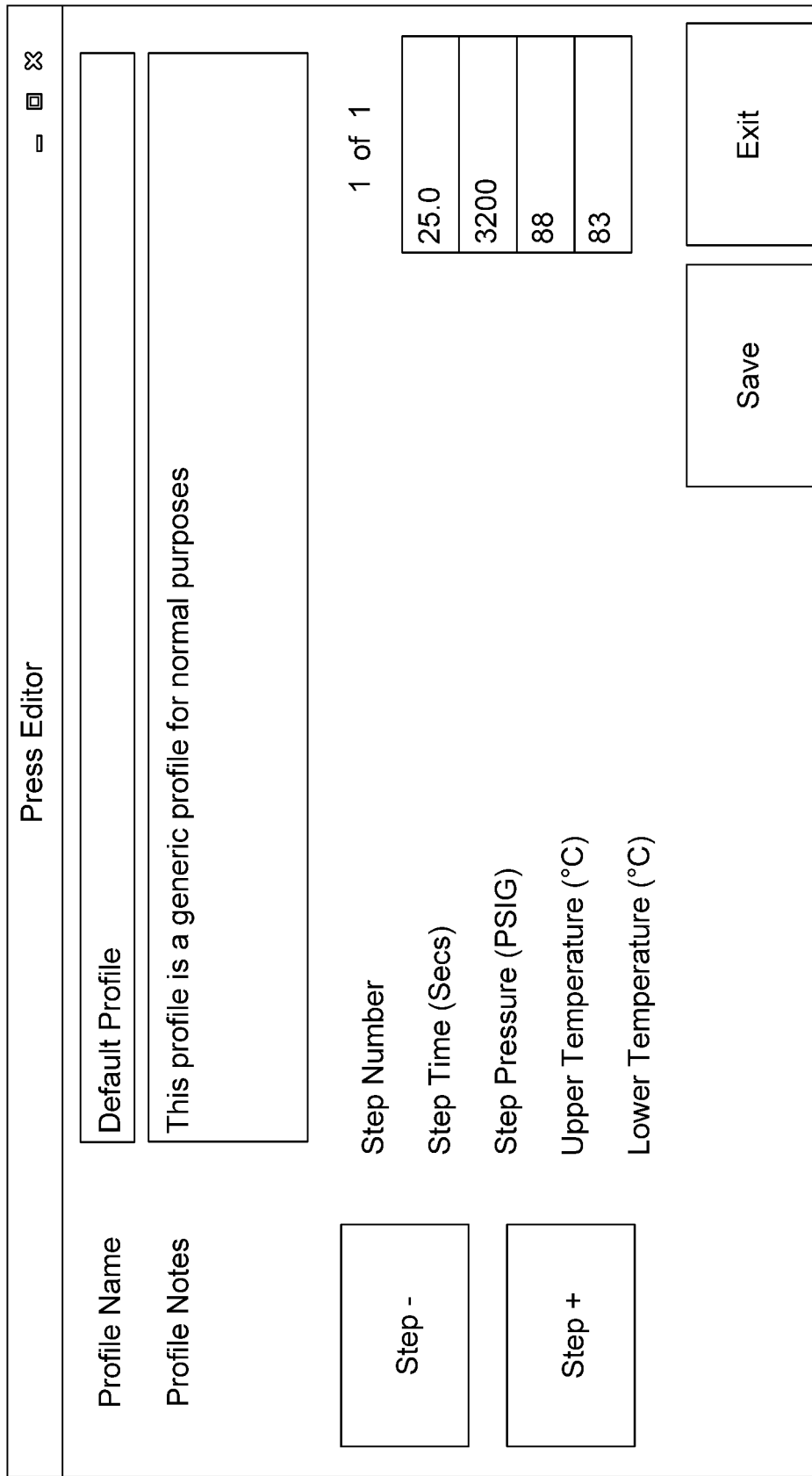

FIGS. 27-31 show exemplary touchscreen display graphical user interface (GUI) screens for the described rosin press. FIG. 27 is a "main menu" screen, which shows options to begin a press process, create new profiles, or edit existing profiles. FIG. 28 shows the screen for editing a profile. The profile corresponds to a "recipe" of an extraction process to follow. As shown, a profile can be named (such as "Santa's Beard" or "Default 1"), and the creator can add notes to the profile that explain its purpose, the materials involved, or any other information that the user deems necessary to be shared. Steps are added, and each step has customizable settings for time, pressure, and upper and lower platen temperatures. The creator of the profile can create as many steps as necessary for a given process.

For example, for step 1, pressure might be set to 500 PSI for 30 seconds, at a 200 degree Fahrenheit temperature. And for Step 2 pressure might be set to 1000 PSI at 210 Degrees temperature for 35 seconds. Using the GUI in FIG. 29, the users can add and adjust steps as necessary. For manual runs or runs that do not involve the GUI, the user can manually make adjustments to the system on pressure and temperature and carry out steps to in a recipe as well. However, the GUI eliminates the need for that intensive labor and offers additional benefits. In either case, as those skilled in the art will appreciate, recipes will vary depending on the product and specific application. As shown in FIG. 29, a pop-up touchscreen "keyboard" can be used for entering data, or in the alternative, a standard physical computer keyboard or other input mechanism can be connected to the system.

In most circumstances, the pressure will range from as low as 10 PSI to as high as 5,000 PSI throughout the course of any specific run. And the temperature will range from ambient up to 235 degrees Fahrenheit in most applications (if too hot, the product will be destroyed). These minimums and maximums vary depending on the product and specific application.

Returning to FIG. 28, when the profile creator has finished setting up all the steps of a given recipe/profile, he/she selects the save button.

Figure 30:
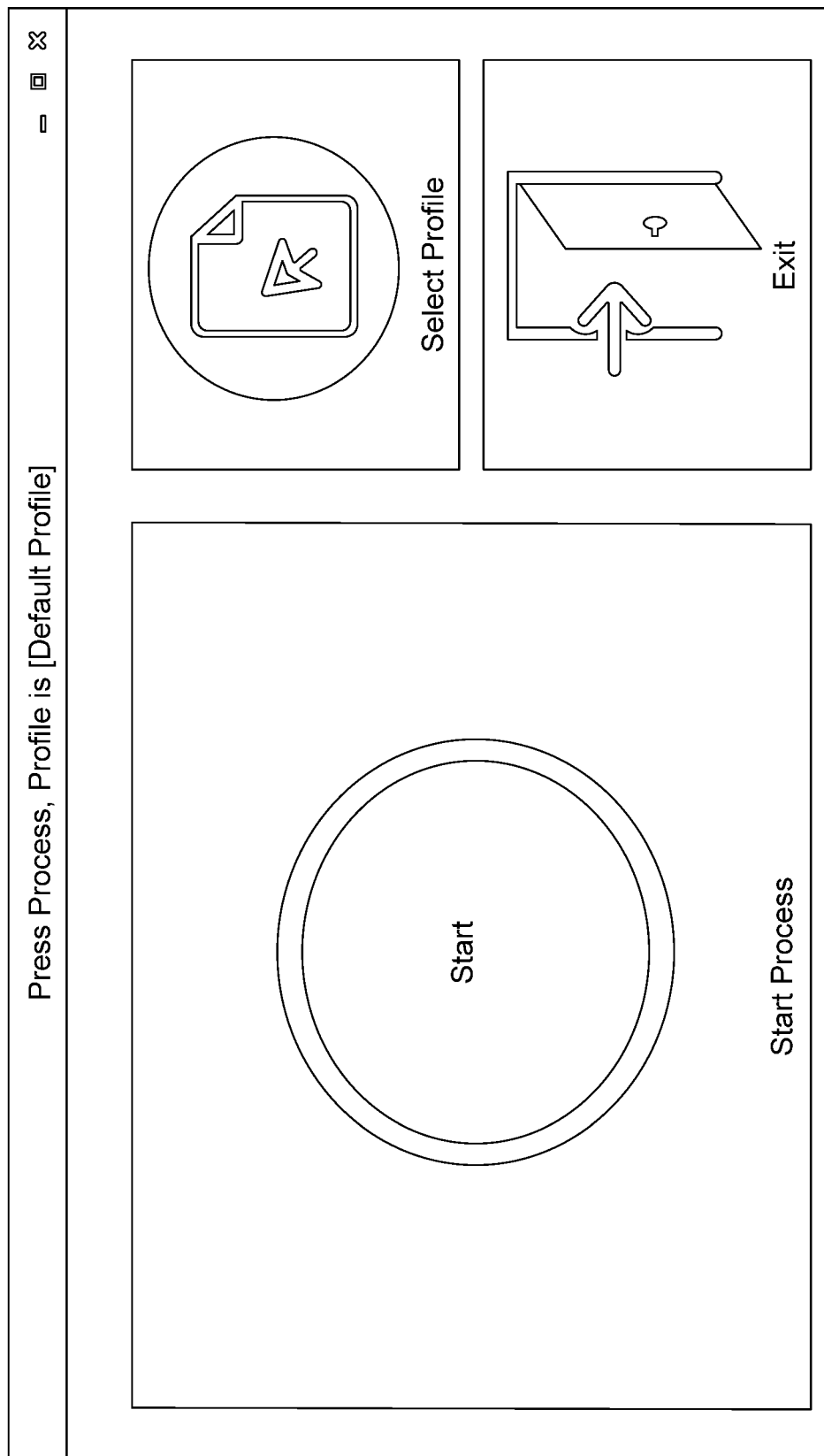
Figure 31:
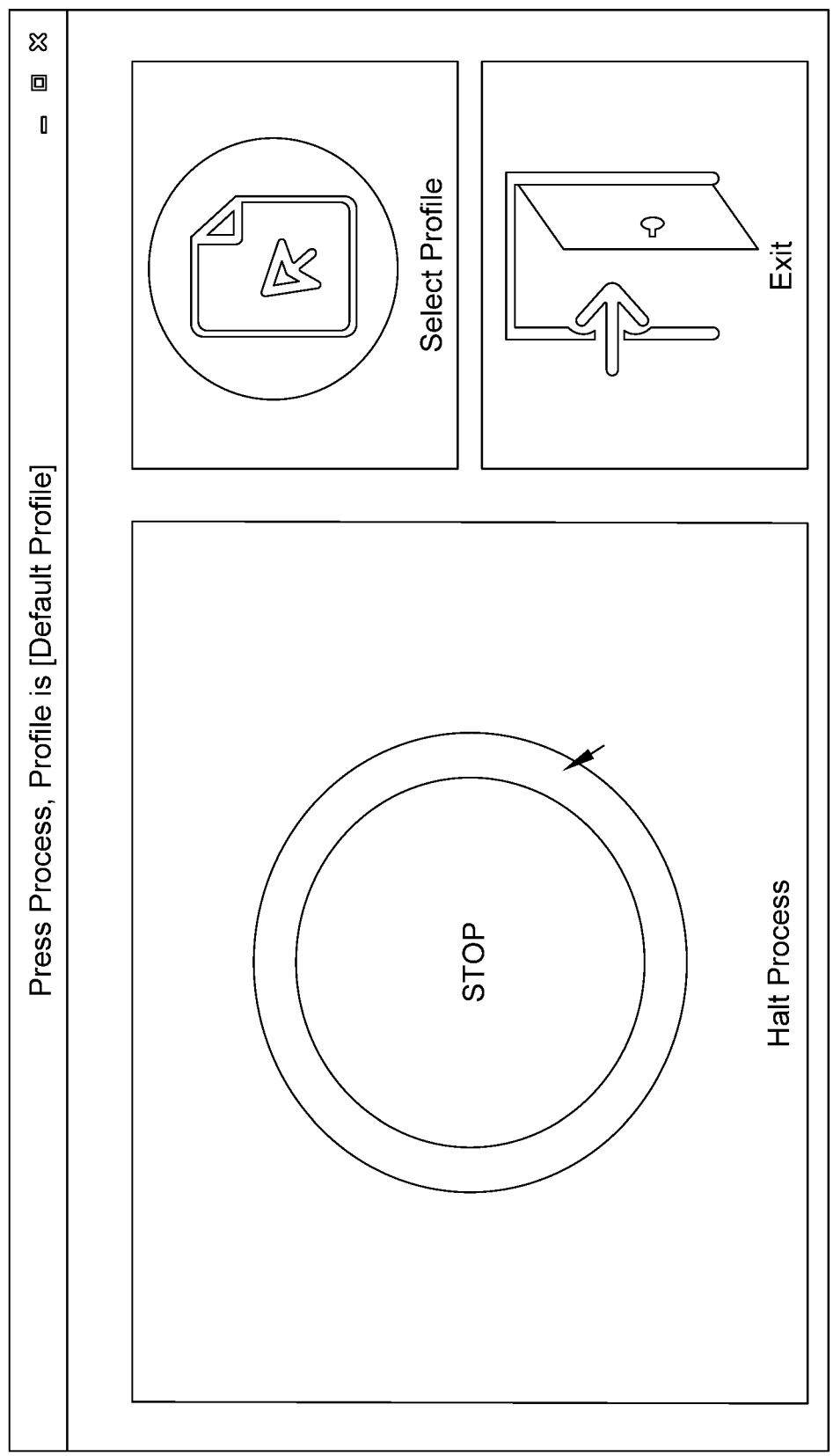

FIG. 30 shows an exemplary screen for after the "process" screen is selected from the main menu FIG. 27. The user has the option to "Start" a process—as shown initially a default profile is in place for when "Start" is selected. If the user prefers not to use the default profile for extraction, he selects the "select profile" button, which brings up a list of profiles for selection. In the alternative, the user can enter a name or other identifier corresponding to a specific profile/recipe he wished to select, rather than selecting form a list. FIG. 31 shows a screen that can appear during a pressing process, with the option to "stop" at any time. In the alternative, each of the steps can be shown on the screen as they are carried out during the recipe (current time, current pressure, current temperature, etc.).

In the computerized system with a display, either the touchscreen display described above, or a separate display (such as a large display attached to the top I-beam support (10)) is used to show various steps of the pressing process as they occur. For example, the display can show "processing" in yellow while the press is in operation, and then display the word "completed" in green when the pressing process is complete. As another example, if the ultrasonic sensors are tripped, an "Alert Stop" message can be shown on the screen in red to indicate the problem (or a similar warning to prevent users from placing anything in the pressing area during operations). Optionally, the computerized system can be linked to an audio system that provides corresponding auditory prompts for the user as well. For example, the audio system can make a certain sound (such as a beep or series of beeps) each time the press is starting operations, and/or sound a horn or a loud beep each time the process is complete. The system can also make an alarm sound each time the ultrasonic sensors are tripped (or for other necessary alerts). Optionally, the graphical user interface also includes volume controls for the audio system.

The rosin press and system can also optionally be equipped with Bluetooth, WIFI, and/or other wireless technologies to wirelessly connect to the internet and to cellular phones, tablets, and other remote devices. In this form, software is provided and installed on the computer system of the rosin press that allows the computer system of the rosin press to communicate and interact with software applications on phones, tablets, or other wireless devices (including, for example, applications that are downloaded over the internet or otherwise provided from the rosin press manufacturer, a third party server, or "app store"). The wireless devices can be used to program, control, and/or monitor the press. The software that is installed on the rosin press and wireless devices can be provided, for example, by the rosin press manufacturer or a third party on its behalf. The graphical user interface for the remote devices can be similar to the graphical user interface described above, or modified as necessary. Multiple devices and users can download the software for communicating with and controlling the rosin press, and different categories of permissions can be provided for different device users (for example, administrative permissions for some users but not others). Devices and users can also seamlessly share recipes and other information about the presses with each other and between the presses themselves (for example, a recipe saved on one press can be shared wirelessly over the internet or through an intermediary wireless device with another press).

As an example, the "select profile" option can be connected to a worldwide database of profiles (or a database of profiles shared with multiple specific users) not just locally stored profiles corresponding to recipes. These profiles can be retrieved through a local network or the internet, and certain profiles can be selected for permanent storage on a user device or on a memory of the rosin press computer.

A computerized tracking system can be incorporated for tracking each run of the press and storing the process and results in memory. For example, each time the machine is started and stopped or each time a certain recipe is used to extract rosin, the whole operation can be tracked. This allows the use of the machine to be tracked for auditing and maintenance purposes, and also allows for research into how successful certain recipes are over time. In addition, an estimated expected yield from the extractions that take place over a certain period of time can be compared to actual yield during that same period, for purposes of understanding efficiency (and also tracking whether product is unexpectedly missing that should have been expected from the extractions). Furthermore, by tracking each run of the press, the user can be alerted as to when the rosin collection tray or other collection system is full or close to full.

The tracked number of presses and other results can also be shown on the display of the system. In one example, a "maximum number of presses" before emptying the collection system can be set and displayed prior to starting a series of presses. The system can "count up" toward that maximum number with each run of the press and alert the user when the maximum number of press runs is reached. In one variation of this form, the system can be programmed to discontinue pressing operations once the maximum number of press runs is reached, and to require confirmation that the rosin collection system has been emptied in order to allow pressing operations to resume.

To help explain the system, specific examples of the operations of the rosin press and components are discussed below.

The process begins with placement of the rosin press filter bag directly on the lower platen. As explained above, the plant material to be pressed into rosin can be dried or freeze dried cannabis flowers (which involves minimal pre-processing), kief (or dry sift), or it can be plant material that has already been processed, such as hash or "bubble hash." See, e.g., Pure Pressure's "Pikes Peak, Longs Peak, V2 User Manual R2.1" at page 19, and Philosopher Seeds Blog "Making Bubble Hash with ice and water." Typically, the plant material is stored in a mesh filter bag with pore openings that are between 25 micron and 250 micron, depending on the application.

The filter bag is typically about the same width and length as the rectangular, flat surfaces 52 and 64. With the devices and systems described herein, because of the two hydraulic presses and upper platen support rod for distributing force on the upper platen, the filter bag width and length can be larger than usual. For example, a filter bag size of 3"×10" has been used effectively with press described herein (and larger filter bag sizes can be used by applying the principles disclosed herein to "scale up" the size of the press (for example, more than two hydraulic rams, additional upper platen support brackets, and/or a longer upper platen support rod can be used to increase the size of the platens)).

With the larger filter bag size, more plant material is used in a single pressing, while maintaining a comparable yield per gram of material, resulting in a higher total yield of rosin compared with smaller bags and existing systems. Furthermore no parchment paper is required to be placed between the upper or lower platen and the filter bag containing plant material.

Next, the upper and lower platens are heated to the desired initial temperature. This can be accomplished by powering the cartridge heaters with an appropriate voltage corresponding to the desired temperature.

Next, the hydraulic fluid is pumped from the pump (or pumps) to each of the hydraulic pistons (24a and 24b) to create the desired amount of pressure on the platens and the product. Pressure gauges connect to the platens can be read manually and or adjusted manually, or pressure sensors can feed pressure readings back to an electronic control system to adjust the pressure fed to the hydraulic pistons. The hydraulic pistons drive the hydraulic rams (26a and 26b) which correspondingly drive the upper platen (36) through connections at the two center bores 34a and 34b and through the upper platen support rod (38).

During pressing operations, the temperature and pressure are usually adjusted and applied during set intervals of time according to a recipe (as explained above), in order to maximize yield from the plant material. For example, step 1 is an initial pressure and temperature for an interval of time, step 2 is a different pressure and temperature for an interval of time, step 3 is yet another pressure and temperature for an interval of time, and so on, until the process is completed.

At a time soon after the process of applying heat and pressure begins, the rosin begins to ooze from the rosin filter bag and into the gutter rail collection system of the lower platen (22). The rosin can be similar to a liquid, like an oil, or more like a thicker "sap," with varying levels of viscosity, depending on the application. Furthermore, the sap tends to harden or become less viscous as the temperature of the rosin decreases.

However, as the rosin is oozing from the rosin filter bag, it is typically at a temperature of 150 degrees or higher, and it is therefore relatively viscous. At this temperature, in most applications, the rosin is viscous to enter the gutter rail system and by force of gravity (in combination with the additional rosin oozing from the bag and pushing behind it), it will flow down the gutters toward the corners of the lower platen (22). When the rosin reaches the corners, it drips through the holes (86a-86d in FIG. 23) in the rosin press floor (18), and into cups, a collection tray (or trays), or another suitable collector underneath the rosin press floor After the recipe is complete and/or the rosin has stopped oozing from the filter bag, the process ends by reducing the pressure and temperature of the press. For example, pressure can be reduced by pumping hydraulic fluid out of the bottom chamber outlets (50a and 50b) of the hydraulic pistons (24a and 24b), until the pistons and upper platen retract (usually back to their starting position). Again, this can be computer-controlled or manually initiated by the user.

When the process is complete, the collected rosin can be scraped from the tray, or if it is still warm enough to be viscous, it can be poured from the tray into some other storage. In the alternative, the rosin is not poured from the tray after a single press, and with a large tray, rosin from multiple (even one hundred or more) press operations can be collected before it is required to be moved from the tray to another storage container.

Figure 32:
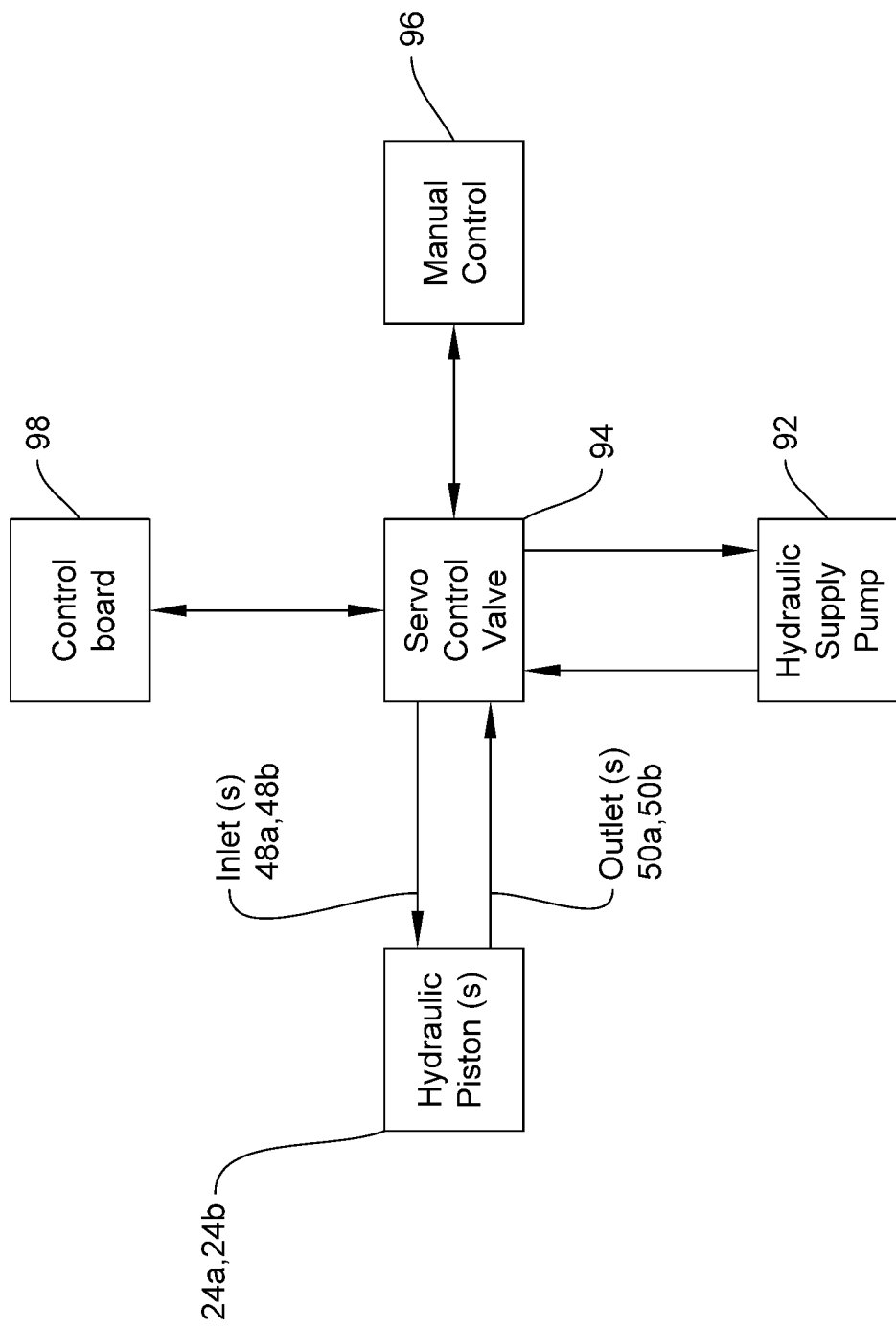
FIG. 32 is a diagram showing an exemplary system for controlling the supply of hydraulic pressure to the hydraulic pistons.

FIG. 32 is a diagram showing an exemplary system for controlling the supply of hydraulic pressure to the hydraulic pistons. As shown the hydraulic supply pump (92) includes supply fluid to/from the servo control valve (94), which ultimately regulates the fluid supply to/from the hydraulic pistons (24a and 24b). The servo control valve can be computer controlled by a control board (98) or manual controlled (96) by hand with suitable mechanisms for opening/closing the valve.

What is claimed is:

1. A hydraulic rosin press comprising:
   a) a first hydraulic piston for driving a first hydraulic ram;
   b) a second hydraulic piston for driving a second hydraulic ram;
   c) an upper platen including a flat surface pressing area that is configured to apply pressure to a plant material during pressing operations, wherein the first hydraulic ram and the second hydraulic ram are each positioned to contact and simultaneously transmit force to the upper platen, wherein the magnitude of the force is controllable based on pressure readings from at least one pressure sensor during pressing operations; and
   d) a lower platen including: (1) a flat surface pressing area upon which the plant material rests during pressing operations, wherein the lower platen flat surface pressing area is solid, and (2) a gutter rail collection system surrounding the lower platen flat surface pressing area, wherein the gutter rail collection system comprises peaks and sloping rails configured to guide and collect rosin extracted from the plant material during pressing operations.

2. The hydraulic rosin press of claim 1, further comprising a collection tray, wherein the gutter rail collection system includes one or more openings through the bottom of the lower platen for guiding extracted rosin into the collection tray.

3. The hydraulic rosin press of claim 1, further comprising:
   e) a horizontal top support above the hydraulic pistons;
   f) first and second vertical side supports connected to the horizontal top support, wherein
      a. the first and second vertical side supports are parallel to each other and extend downward from the horizontal top support;
      b. the first and second vertical side supports are the same length;
   g) a first horizontal side base support located beneath the first vertical side support to form a "T" structure with the first vertical side support;
   h) first and second cross supports that connect from each end of the first horizontal side base support to the first vertical side support to form a first triangular support structure;
   i) a second horizontal side base support located beneath the second vertical side support to form a "T" structure with the second vertical side support;
   j) third and fourth cross supports that connect from each end of the second horizontal side base support to the second vertical side support to form a second triangular support structure;
   k) a horizontal base center support located beneath the horizontal top support and beneath the hydraulic pistons and a pressing area of the rosin press, such that the horizontal base center support and horizontal top support are parallel to each other located between the pressing area of the rosin press, wherein the horizontal base center support is connected to the first horizontal side base support, second horizontal side base support, first vertical side support, and second vertical side support.

4. The hydraulic rosin press of claim 3 wherein the horizontal top support, horizontal base center support, first horizontal side base support, second horizontal side base support, first vertical side support, and second vertical side support are I-beams.

5. The hydraulic rosin press of claim 1, wherein the lower platen is removeable.

6. The hydraulic rosin press of claim 1, further comprising a temperature sensor attached to the upper platen, wherein the temperature sensor is configured to send a signal to interrupt heat supply to the upper platen if the temperature measured by the sensor exceeds a designated maximum temperature.

7. The hydraulic rosin press of claim 1, further comprising ultrasonic sensors arranged to form an ultrasonic field around a pressing area of the rosin press when activated, wherein the rosin press is configured to automatically shut off when the ultrasonic field is interrupted during pressing operations.

* * * * *